United States Patent
Ackerman et al.

(10) Patent No.: US 9,665,543 B2
(45) Date of Patent: May 30, 2017

(54) SYSTEM AND METHOD FOR REFERENCE VALIDATION IN WORD PROCESSOR DOCUMENTS

(75) Inventors: Shirley S. Ackerman, Poughkeepsie, NY (US); Sheila E Allen, Peekskill, NY (US); Mike D. Hocker, Staatsburg, NY (US); James G McLean, Fuquay-Varina, NC (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 822 days.

(21) Appl. No.: 11/689,370

(22) Filed: Mar. 21, 2007

(65) Prior Publication Data

US 2008/0235565 A1   Sep. 25, 2008

(51) Int. Cl.
  G06F 17/00 (2006.01)
  G06F 17/21 (2006.01)
  G06F 17/22 (2006.01)

(52) U.S. Cl.
  CPC ........ *G06F 17/211* (2013.01); *G06F 17/2235* (2013.01)

(58) Field of Classification Search
  CPC .............................. G06F 17/00; G06F 17/2235
  USPC ........ 715/255, 205, 206, 207, 208; 709/223, 709/200, 217, 209
  See application file for complete search history.

(56) References Cited

U.S. PATENT DOCUMENTS

| | | | | |
|---|---|---|---|---|
| 5,974,445 A * | 10/1999 | Pivnichny et al. | ........... | 709/203 |
| 5,978,828 A * | 11/1999 | Greer et al. | ................... | 709/224 |
| 6,088,707 A * | 7/2000 | Bates et al. | .................... | 715/235 |
| 6,151,708 A * | 11/2000 | Pedrizetti et al. | ............ | 717/173 |
| 6,253,204 B1 | 6/2001 | Glass | | |
| 6,353,850 B1 * | 3/2002 | Wies et al. | .................... | 709/203 |
| 6,578,078 B1 * | 6/2003 | Smith et al. | ................... | 709/224 |
| 6,789,255 B1 * | 9/2004 | Pedrizetti et al. | ............ | 717/169 |
| 6,895,551 B1 * | 5/2005 | Huang et al. | .................. | 715/205 |

(Continued)

*Primary Examiner* — Stephen Hong
*Assistant Examiner* — Marshon Robinson
(74) *Attorney, Agent, or Firm* — Patent Portfolio Builders PLLC

(57) ABSTRACT

Systems and methods are provided for supporting the use of hypertext links in documents such as word processor documents. A given word processor document is scanned for link representations to sources that are external to the word processor document. These identified link representations are then checked for validity and functionality, and the external sources are also checked for content and accessibility. In order to facilitate checking the content of the external sources, the word processor document is appended to include all or part of the content of each linked external source. The appended information is then used for subsequent content comparisons. Checking of the link representations and external sources is used to produce a current validity status for each link representations. The validity status of the links within a given document are indicated to an author or reader using visual queues by modifying non-link aspects of the word processor document, by modifying the appearance of a file name or file folder associated with the word processor document or by modifying the appearance of a cursor used in conjunction with the word processor document.

19 Claims, 4 Drawing Sheets

(56) References Cited

U.S. PATENT DOCUMENTS

| | | | |
|---|---|---|---|
| 6,898,760 B2 | 5/2005 | Bedford | |
| 6,931,597 B1* | 8/2005 | Prakash | 715/741 |
| 7,194,531 B2* | 3/2007 | Donker et al. | 709/223 |
| 7,464,326 B2* | 12/2008 | Kawai et al. | 715/205 |
| 7,571,325 B1* | 8/2009 | Cooley et al. | 713/181 |
| 2001/0047404 A1* | 11/2001 | Suda | 709/223 |
| 2002/0133570 A1* | 9/2002 | Michel | 709/219 |
| 2002/0169753 A1* | 11/2002 | Yoshimura et al. | 707/2 |
| 2003/0037070 A1* | 2/2003 | Marston | 707/200 |
| 2003/0110384 A1* | 6/2003 | Carro | 713/181 |
| 2003/0158953 A1* | 8/2003 | Lal | 709/230 |
| 2004/0078564 A1* | 4/2004 | Abdulhayoglu | 713/156 |
| 2004/0083424 A1 | 4/2004 | Kawai et al. | |
| 2004/0107267 A1* | 6/2004 | Donker et al. | 709/218 |
| 2004/0215664 A1* | 10/2004 | Hennings et al. | 707/104.1 |
| 2004/0225658 A1 | 11/2004 | Horber | |
| 2004/0260636 A1* | 12/2004 | Marceau et al. | 705/35 |
| 2005/0071766 A1* | 3/2005 | Brill et al. | 715/738 |
| 2005/0086296 A1 | 4/2005 | Chi | |
| 2005/0289446 A1 | 12/2005 | Moncsko | |
| 2006/0026213 A1 | 2/2006 | Yaskin | |
| 2006/0048049 A1* | 3/2006 | Sholl | 715/513 |
| 2006/0064394 A1* | 3/2006 | Dettinger et al. | 707/1 |
| 2008/0034294 A1* | 2/2008 | Ronkainen et al. | 715/702 |

\* cited by examiner

SYSTEM AND METHOD FOR REFERENCE VALIDATION IN WORD PROCESSOR DOCUMENTS

FIELD OF THE INVENTION

The present invention relates to word processing programs and in particular to validation of cited references within word processor documents.

BACKGROUND OF THE INVENTION

Network-based communication, and in particular the Internet, facilitates rapid and easy access to sources of information. This access to information is utilized by all Internet users, including researchers and authors of technical literature. The sources of information accessed include printed articles that are posted or made accessible through the Internet and articles or documents that are strictly electronic publications. When these Internet-accessible sources are referenced in a document or publication, the reference includes a written link that can be used to access the document. In addition, when the publication containing the Internet-accessible source is viewed in an electronic format, the written links are also provided in hypertext format, enabling a user to simply click on the hyperlink to be taken to the referenced source. When using the hypertext link format, the actual text of the reference does not have to include the actual written link. These hypertext links can be used within various types of publications including within word processor documents.

Although network-based communications provide rapid and easy sharing of information, this ease of exchange also creates an environment that is fluid and capable of rapid change. Sources of information can be modified or moved to different locations across the network. In addition, various forms and versions of the same source of information can be propagated across the network. In addition to issues covering the actual content of the information sources, the network itself can experience changes and failures. For example nodes within the network can experience temporary or permanent failures, inhibiting access to sources of information. Once a link to a source is created within a document, changes to the link or to the information contained in the source associated with that link affect the veracity and usability of the original document. The authors and users of these documents want to ensure the veracity of the citations and links within the document.

Often, articles appearing in scientific journals are created as word processor documents containing a large number of references that are embedded in the text of the articles, provided in footnotes or provided in a list of references at the end of the articles. All of these reference lists can contain webpage uniform resource locators (URLs) that need to be checked for viability and status both before the article is published, for example typeset and published, and during the period of time that the article is available in an electronic format. Therefore, systems and methods are desired to check the links embedded in documents and to visually indicate link characteristics within the document.

SUMMARY OF THE INVENTION

The present invention is directed to systems and methods that check links embedded in a document containing text such as editable text. Suitable document include, but are not limited to, word processor documents such as a Microsoft® Word document, a Microsoft® Power Point document or a portable document format (PDF) file. As used herein, document refers to any suitable type of document include word processor documents. The embedded links are links to sources external to the document. A visual indication of the status of the external sources associated with the links and of the veracity of the links themselves is provided using aspects of the document other than the textual or graphical representation of the embedded link. For example, the title of the document can be displayed in a red color if one of the sources associated with one of the links has either disappeared or changed. Checking the validity of the links and the external sources associated with the links and providing a visual indication of the validity allows the author of the article to take care to provide valid links and to remove defunct links prior to final publication. In addition, readers of the article are provided with a current, real-time indication of the validity of the links within a document, even well after the time the article was first written and published.

The document is scanned for links, and the status of each link found within the document is tested. Based upon the results of the status tests of the links, visual modifications of the desired document aspects are made to reflect the test findings. Systems and methods in accordance with the present invention can be applied to any document containing embedded network-based links to sources external to the document and can be applied substantially contemporaneously with the creation of the document or can be applied a period of time after the document was first created and published.

In accordance with one exemplary embodiment for supporting links within a document in accordance with the present invention, representations embedded within a document of links to sources external to the document are identified. Suitable representations include alpha-numeric representations of the links that are contained within the text of the document. A current validity status is identified for each identified link representation. The current validity status is a representation of one or more attributes of each link including, but not limited to, any changes to the external source associated with that link, a current operability, i.e., functionality, of that link, a size associated with the external source associated with that link, a rate at which the associated external source is updated, a quantity of images contained within the associated external source, a current level of accessibility of the associated external source, a presence of inappropriate content in the associated external source, an identification of any improper formatting of that link, an identification of whether or not the chosen link represents a sub-optimal representation of the associated external source, a popularity level assigned to the associated external source, a citation of the associated external source, a search engine rank for the associated external source and combinations thereof.

The identified current validity status of one or more of the identified link representations is then expressed using aspects of the document other than the identified link representations. In one embodiment, the identified current validity status is expressed by modifying a graphical representation of a cursor associated with a point-and-click type input device and utilized in conjunction with the document. These modifications of the cursor include modifying a color, font, size, blink rate or likeness of the cursor, associating an additional symbol with the cursor, associating a pop-up bubble comprising explanatory text with the cursor and combinations thereof. In one embodiment, the graphical representation of the cursor is modified to correspond to the current validity status of each link representation as the cursor traverses that link representation. In addition to modifying the cursor to provide a visual indication of the current validity status of each link, a tactile sensation can be provided in the point-and-click type input device associated with the cursor in accordance with the current validity status of each link representation as the cursor traverses that link representation. In addition to modifying non-link aspects of the document, an appearance of a file name associated with the document or an appearance of a file folder containing the document is modified in accordance with at least one current validity status. This includes changing an icon or text representing the file name or the file folder. In one embodiment, both link representations and non-link representations are modified in accordance with the current validity status.

In one embodiment, the document is appended to include initial content representations of each external source. These content representations can be stored, for example, in an appendix of the document. The content can represent all the content within the external source or a portion of the content and can be in forms such as a hash function representation, an encrypted representation or combinations thereof. The appended content can be used to identifying the current validity status of external sources associated with each link representation. For example, a present content representation of each external source is obtained, and these current content representations are compared to the initial content representations. Any inconsistencies between the two representations are identified, and these inconsistencies are used in the determination of the current validity status.

In addition to providing electronic representations of the current validity status, a visual indication of the current validity status can be provided within a printed copy of the document or on a printer separator page that is provided when the document is printed. The current validity status for one or more of the link representations within the document can be communicated outside of the document to additional documents containing the same link representations to the same external sources. In addition, the current validity status can be communicated to a third party such as an author, reader or system administrator using electronic communication mechanisms including E-mail and instant messaging.

DETAILED DESCRIPTION

Figure 1:
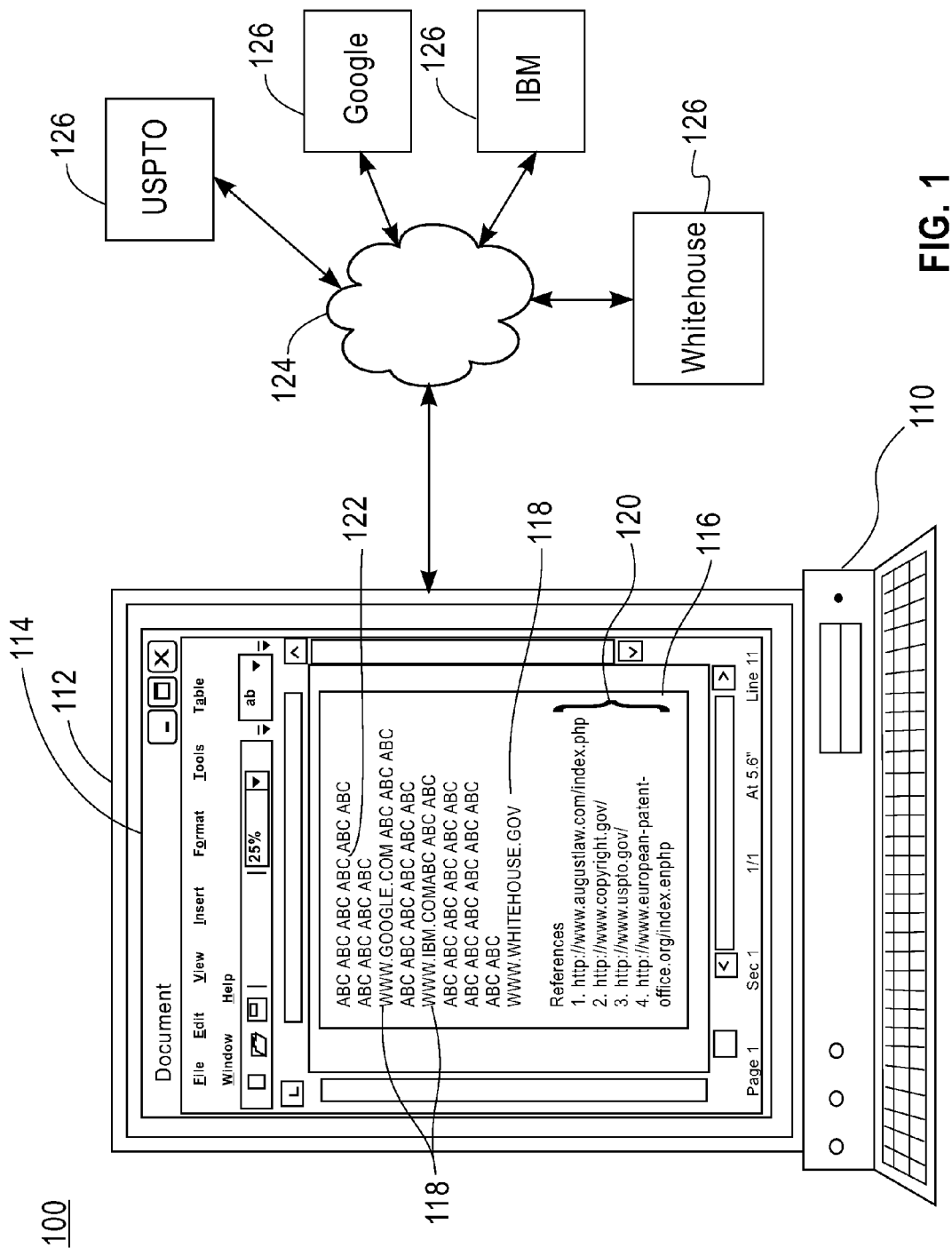
FIG. 1 is a schematic representation of an embodiment of a system utilizing links within documents in accordance with the present invention.

Referring initially to FIG. 1, an exemplary embodiment of a networked environment 100 for use in accordance with the present invention is illustrated. A computing system 110 having a display output device 112 is running a program 114, for example a word processor program, that can produce documents 116, for example word processor documents. Suitable computing systems include local computing systems such as desktop and laptop computing systems running a windows-based operating environment. The computing systems could also include centralized server-based systems and portable or handheld computing systems such as tablets and personal digital assistants. In general, any computing system capable of producing and displaying documents and of communicating with other systems through a network environment can be used. The word processor program can be any program that produces or displays text and hyperlinks. These hyperlinks can be located throughout the document including hyperlinks 118 located within the text 122 of the document 116 and lists of hyperlinks 120 provided in footnotes, endnotes or references lists. In general, a hyperlink provides for select and click access to the location or documents referenced by the hyperlink using methods well known in windows-based computing environments. Typically, the active hyperlinks are represented in blue underlined text within the document. In general, the hyperlinks, referred to generally as links, are disposed or embedded within the document. The representations of the links within the documents are generally alpha-numeric representations that indicate the title or location of the external source associated with the link. Suitable word processor programs are used to create and edit the electronic document, for example a research document or publication. The document can be stored in any format, such as Microsoft® Word format, hypertext markup language (HTML) format, extensible markup language (XML) format or any similar format for displaying documents known to those skilled in the art. In addition, other programs may be used to implement the functionality such as an Internet browser, a document viewer or any program capable of displaying or editing documents known to those skilled in the art.

In order to provide functionality to the links within the document, the computing system is in communication with one or more networks 124 including local area networks and wide area networks such as the Internet. The links provide a connection from the document 116 to one or more sources 126 external to the document across the networks 124. Therefore, by selecting one of the link representations in the document or by cutting and pasting the link representations into a Internet browser, the reader is directed to one of these external sources, and data from one or more of these external sources is retrieved and delivered to the user. In addition to being used for research documents and journal articles, exemplary systems and methods in accordance with the present invention are utilized with any electronic document that cites, links to, or refers to another electronic document or source located and accessible across a network using a network address.

According to one embodiment of the present invention, the document 116 includes text 122 and link representations 118, 120 to sources 126 external to the document 116. Suitable representations for the links, which can also be citations to published articles, include, but are not limited to, any format used by authors to cite references such as textual citations, footnotes and endnotes. In addition, the link representations can be contained in a bibliography, list of sources, appendix, or any other listing that authors use to list citations. In one embodiment, the link representation includes the name of the external source, the network address associated with the source, a description of the source and combinations thereof. The network address of the remotely located source can be in the form of a uniform resource locator (URL), a uniform resource identifier (URI), a uniform resource name (URN), an internet protocol (IP) address, a domain name, pathname and filename or any other form of network address known to those skilled in the art.

In one embodiment, the word processor program containing the link representation uses the network address associated with the link representation to send a request across the network 124 to the appropriate external or remote host or node 126 regarding the external source of information referenced in the document. A given remote node or server, upon receiving a request for the external source of information, obtains and forwards the information to the computing system 110 across the network 124. The external source information, once received by the computing system, can be displayed in an appropriate format. In addition, a copy of the information can be stored locally by the computing system for purposes of retrieval when the remote nodes are unavailable or for integrity verification of the external source in accordance with the present invention. These processes of retrieving the external source information are referred to as downloading, copying, caching, or accessing.

A given document can have a large number of link representations or citations. These link representations need to be checked for accuracy and functionality both at the initial time that a given document is published in either electronic or paper form and also at later times. Therefore, exemplary embodiments of systems and methods in accordance with the present invention provide for the checking of both the accuracy and functionality of link representations and the content of the external sources associated with those link representations. Thus, if the cited external source is moved, replaced, or modified, or if the remote host is moved or taken down, then the author, publisher or user can be alerted to these changes. In addition, appropriate corrective measures can be taken. When copies of the external sources are maintained locally, these copies can still be accessed by using an association between the document and the locally stored copies.

Systems and methods in accordance with the present invention highlight the determination of the validity status of a link in a document to the external source to which that link is related by modifying the representation of a word processor file in an operating system listing, e.g., a list of files in the Microsoft® Word File Explorer, by highlighting the directory containing the file or by highlighting aspects of the document itself other than the link representations within the document. For example, when the document is accessed, the title can appear red or the entire background of the document can be red. In another embodiment, the content of each external source is checked. All or part of the content of each external source is collected and stored in the document. In particular, the document is appended to include the content of the external sources. This stored content can be used if a link is broken so that at least some of the referenced information is still available to a user.

Figure 2:
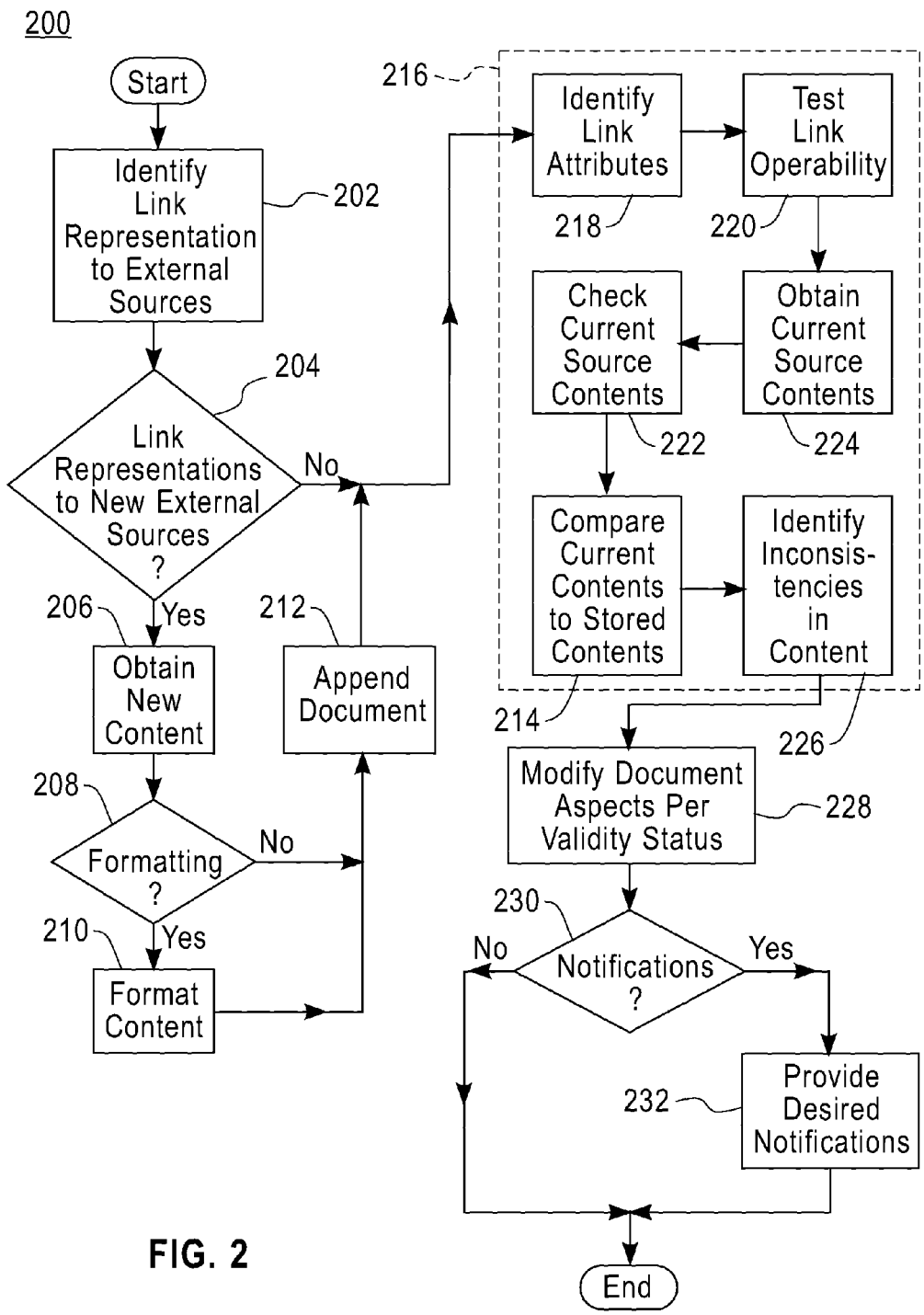
FIG. 2 is a flow chart illustrating an embodiment of a method for supporting links within a document in accordance with the present invention.

Referring to FIG. 2, an exemplary embodiment of a method for supporting links within a document 200 in accordance with the present invention is illustrated. In particular, the method supports the use of links by assuring the functionality of the links and the consistency of the content of the external sources to which the links refer. Initially, the document is scanned and the link representations disposed within the document are identified 202. Suitable methods for scanning a document and identifying the links are known and available in the art. The link representations are suitable to identify sources of information external to the document and include alpha-numeric designations. The scan of the document can be conducted during the creation or drafting of the document, upon completion of the drafting of the document but prior to publishing or typesetting of the document or a period of time after initial publication of the document. Therefore, at any given time, a link and the external source associated with that link can be new. Therefore, a determination is made about whether any of the identified links or associated external sources is new 204.

For new sources, content from each one of these external sources is obtained 206. In one embodiment, all of the content from each external source is obtained. Alternatively, only a portion of the content of each external source is obtained, for example key words or phrases. This obtained information is stored within the document by appending the document 212 to include the obtained content. In one embodiment, the obtained content is placed in one or more appendices of the document. These appendices include both full content and abbreviated content from linked pages. For example, the first 20 lines of HTML content from all linked pages can be attached to a word processor or PDF document in a convenient format or saved in a folder containing portions of the original document and related link information. Therefore, the linked material, or portions thereof, can be transported, shared, or viewed without the reader being on-line.

The obtained content can be stored in the format in which it was extracted or can be modified into any desired format. Therefore, a determination is made about whether any formatting of the obtained content is required 208. If formatting is required, then the obtained data is formatted 210 before the document is appended 212 to include the content. Suitable methods of formatting include, but are not limited to, using encryption or hash functions.

In one embodiment, the obtained content is saved using an encrypted save option that allows the user to encrypt the local copy of the remotely located source document. Suitable methods of encryption are known and available in the art. In one embodiment, the local copy is encrypted, and a decryption key is stored in a metadata tag within the header of the document. When the check is made to determine if the content of the external source has changed, the local copy is decrypted and compared to the remotely located source document.

In one embodiment, a hash of the obtained content of the external source is created. The hash is then used to determine if the external source has changed since the original content was obtained. In one embodiment, hash and date pairs are maintained for popular external sources by search engines so that the update rate of these external sources can be observed.

Suitable hash codes can be generated using any computer algorithm capable of generating hash codes and known to those skilled in the art. Each hash code is created by running the hash code algorithm and using the obtained content from the external source as input to the hash code algorithm. The hash code algorithm can be implemented as a standalone computer program, as a part of the word processor program or by using a series of programs or programming libraries. When the content of the external source is modified, the hash code associated with the external source would also be modified. By comparing hash codes for the same external source generated at different times, a determination can be made about whether the content of the external source has changed. If the hash codes are the same, the document is presumed not to have changed. If the hash codes are different, the document is presumed to have changed.

The methods for supporting links in accordance with the present invention can be launched manually or automatically. For example, the links and external sources can be scanned and checked each time the document is accessed.

Alternatively, a button or other selector within the word processor program is used to initiate the methods for supporting links in accordance with the present invention. A button or selector can also be provided to update linked content in order to keep the supplementary link-content fresh while retaining prior snapshots for any links that were not successfully updated.

Having identified the link representations and obtained the necessary content from the external sources, a current validity status of each link representation and the associated external source is determined 216. The validity status includes both the format and functionality of the link representation itself and the accessibility and content of the external source. Suitable content for the validity status includes, but is not limited to, changed, moved, no longer exists, an indication of web-page size, an update or revision rate, the number of images, the accessibility, the presence of inappropriate content, badly formatted or poorly chosen links, for example links to pages that change daily instead of pages whose content is stable, page popularity, page citation, search engine rank and combinations thereof. In one embodiment, a current validity status is identified for each identified link representation. The current validity status is a representation of one or more attributes of each link including, but not limited to, any changes to the external source associated with that link; a current operability, i.e., functionality, of that link, a size associated with the external source associated with that link, a rate at which the associated external source is updated, a quantity of images contained within the associated external source, a current level of accessibility of the associated external source, a presence of inappropriate content in the associated external source, an identification of any improper formatting of that link, an identification of whether the chosen link represents a sub-optimal representation of the associated external source, a popularity level assigned to the associated external source, a citation of the associated external source, a search engine rank for the associated external source and combinations thereof.

In one embodiment, attributes and operability of both the link representation itself and of the contents of the external source are determined, and these determinations are combined to created the validity status of each link representation. The attributes associated with the link itself are identified 218. These attributes include whether the link points to the best or most up-to-date version of the external source, whether the link representations points to the correct external source and the syntax of the link representation among other factors. Next, the actual physical operability of the link representation is tested 220. Physical operability tests that the network connectivity is functional and that the external source is operable among other factors.

The validity status also includes an analysis of the actual content of the external source. Therefore, the current content of each external source is obtained 224. This content is checked to see if the content is on its face corrupted or objectionable 222. The current contents are then compared to the previously obtained contents that are stored in the document 214. The contents are compared using the same formatting. Any inconsistencies between the compared contents are identified 226. Therefore, the system compares the linked content, captured at the time of document creation or at the time of the last scan, with current content, and flags links to external sources that have changed significantly since publication. Content checking is useful for authors, journal editors and publishers that want to make sure the external sources are not only still active, but still valid with respect to the associated content within the document.

Figure 3:
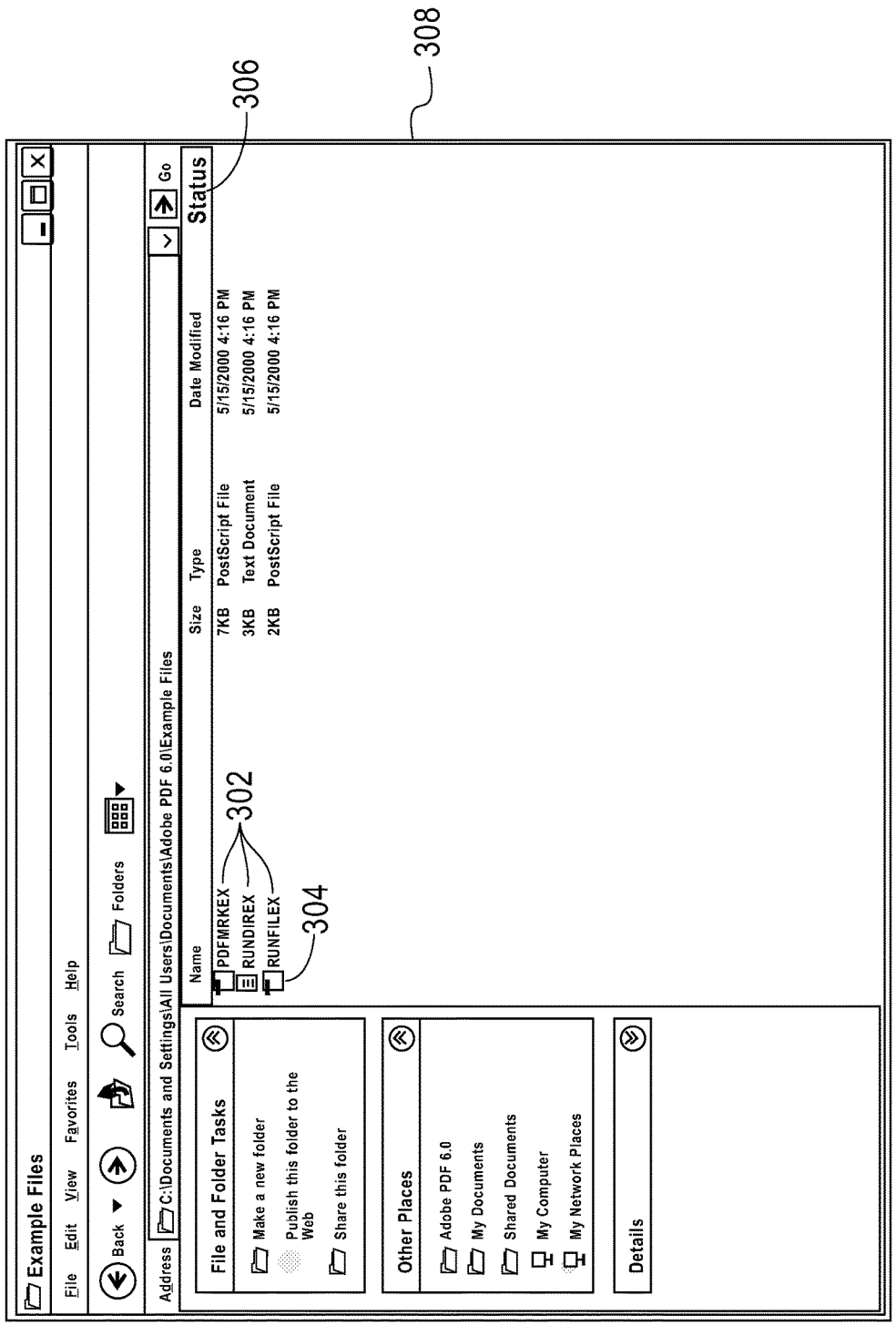
FIG. 3 is a representation of an embodiment of a listing of file names.
Figure 4:
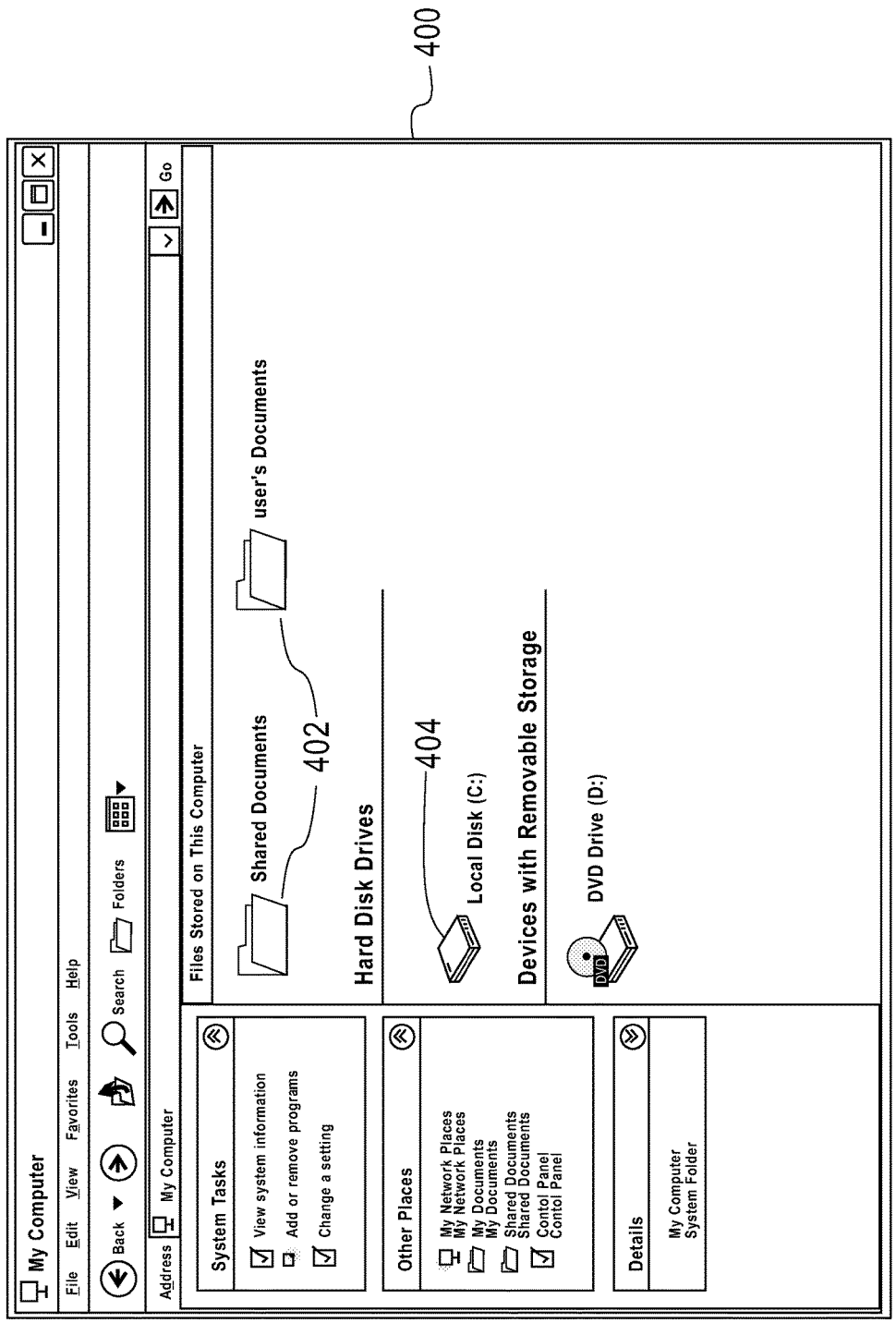
FIG. 4 is a representation of an embodiment of a listing of file folders and disk drives.

All of these identified factors go into determining the validity status associated with each identified link representation, and non-link representation aspects of the document are modified in accordance with the validity status of one or more link representations 228. The modifications include modifications to text or formatting within the document. For example, the modification can change the color, font, size and/or blink rate of any text, place a symbol next to link representation, place a piece of text next to link representation, elicit a pop-up bubble when a cursor hovers over the link representation or combinations thereof. For example, the color of the document title turns red, suggesting that the reader look below for problem references. In one embodiment, the modification changes the icon or text associated with the file name of the document, for example, an icon in a windows-based listing. As illustrated in FIG. 3, the file listing 302 within the file window 308 can be modified in accordance the validity status. This includes modifications to the content or format of the actual text and to any icons 304 associated with the text. In one embodiment, an additional column of information 306 labeled for the status is appended to the file window. For example, the icon and text file name turn red when one or more dead links are found in a file. In one embodiment, the folder containing the file is modified to depict the current validity status. As illustrated in FIG. 4, within a given file window, the icons or text associated with a file folder 402 or with a disk drive 404 containing a file are modified to indicate the validity status of link representations contained within files that are stored within these folders or drives.

In one embodiment, the identified current validity status is expressed by modifying a graphical representation of a cursor associated with a point-and-click type input device and utilized in conjunction with the document. These modifications of the cursor include modifying a color, font, size, blink rate or likeness of the cursor, associating an additional symbol with the cursor, associating a pop-up bubble comprising explanatory text with the cursor and combinations thereof. In one embodiment, the graphical representation of the cursor is modified to correspond to the current validity status of each link representation as the cursor traverses that link representation. In addition to modifying the cursor to provide a visual indication of the current validity status of each link, a tactile sensation can be provided in the point-and-click type input device associated with the cursor in accordance with the current validity status of each link representation as the cursor traverses that link representation.

In additional to providing an indication of the current validity status of each link representation in electronic copies of the document, a visual indication can be provided in a printed copy of the document or on the printer separator page that is produced when the document is printed. For example, the text of the printer separator page can indicate that one or more dead links are in the document. In one embodiment, the steps that are taken to modify document aspects are established in a policy table that is determined by a user, service, company or software provider In one embodiment, links that are corrupted or unavailable are automatically resuscitated or converted into valid links. For example, in addition to identifying and flagging dead links, diagnostic work or automatic resuscitation is performed. Broken or even healthy URLs are replaced with the shorter digital object identifier (DOI) representation that is rapidly becoming a standard for URL representation. In one embodiment, checking the viability of link representations and external sources is realized using a software service, for example like a spell checker, that offers possible corrections to the link representations or external sources. For example, the author, editor or publisher is presented with a list of probable correct DOIs for URLs.

In one embodiment, testing of the status of the link representations and external sources also includes document-to-document communication of the current validity status. Therefore, if one document learns that a link is dead, this information is communicated to the other documents. The current validity status can also be communicated to third parties using a desired communication mechanism. Therefore, a determination is made about whether to provide notifications of the current validity status 230 (FIG. 2). If notifications are to be made, either document-to-document or third party, then the desired notifications are provided 232. For example, an author or reader is notified by e-mail, message, pop-up, fax or phone call when one or more dead links are uncovered in a document. In one embodiment, checking for the current validity status checks different levels of dead links, and this level may be determined by an analysis of words on the page, e.g., "The accessed page has moved." For example, the "404 File not Found" error is obvious, because this error displays a blank page. However, many sites are becoming a little smarter and display nontypical messages. These non-standard error messages may be considered a "valid" page. Therefore, a mechanism is provided to check against certain common phrases, i.e., default phrases, contained in such pages. If one of these common phrases is detected, an appropriate modification is provided. In addition, non-traditional messages can be stored and used for subsequent validity status checking. In one embodiment, default phrase lists are supplied by companies, services or system administrators.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for supporting links within a document in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object-oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention and can be executed or performed in any suitable order. Therefore, it will be understood that the appended claims are intended to cover all such modifications and embodiments, which would come within the spirit and scope of the present invention.

What is claimed is:

1. A method for supporting links within a document containing text, the method comprising:

identifying representations embedded within a word processor document of links to sources external to the word processor document, the word processor document produced using a word processor program running on a computing system and configured to create, edit and display both text and hyperlinks within the word processor document;

appending the word processor document to include initial content representations comprising all content of each external source;

identifying a current validity status automatically for each identified link representation during creation of the word processor document, at an initial time of publication of the word processing document and at a later time after initial publication, the validity status comprising accuracy of the link representation, functionality of the link representation, accessibility of the external sources and content of the external sources;

expressing the identified current validity status of one or more of the identified link representations using aspects of the document other than the identified link representations; and providing notification to an author and readers of the word processor document of the current validity status.

2. The method of claim 1, wherein the step of identifying representations further comprises identifying alpha-numeric representations.

3. The method of claim 1, wherein the current validity status of each link further comprises an identification for each link of at least one of:

changes to the external source associated with that link;
a current operability of that link;
a size of the external source associated with that link;
a rate at which the associated external source is updated;
a quantity of images contained within the associated external source;
a current level of accessibility of the associated external source;
a presence of inappropriate content in the associated external source;
improper formatting of that link;
sub-optimal representations of the associated external source;
a popularity level assigned to the associated external source;
a citation of the associated external source;
a search engine rank for the associated external source, and combinations thereof.

4. The method of claim 1, wherein the step of expressing the identified current validity status further comprises modifying a graphical representation of a cursor associated with a point-and-click type input device and utilized in conjunction with the word processor document.

5. The method of claim 4, wherein the step of modifying the graphical representation of the cursor further comprises modifying a color, font, size, blink rate or likeness of the cursor, associating an additional symbol with the cursor, associating a pop-up bubble comprising explanatory text with the cursor or combinations thereof.

6. The method of claim 4, wherein the step of modifying the graphical representation of the cursor further comprises modifying the graphical representation of the cursor to correspond to the current validity status of each link representation as the cursor traverses that link representation.

7. The method of claim 1, wherein the step of expressing the identified current validity status further comprises providing a tactile sensation in the associated point-and-click type input device in accordance with the current validity status of each link representation as the cursor traverses that link representation.

8. The method of claim 1, wherein the step of appending the word processor document to include initial content representations further comprises encrypting the initial content representations and storing a decryption key in a metadata tag within a header of the word processor document.

9. The method of claim 1, wherein the step of identifying the current validity status further comprises:

obtaining a present content representation of each external source; comparing the current content representations to the initial content representations; and
identifying any inconsistencies between the two representations.

10. The method of claim 1, wherein the step of expressing the identified current validity status further comprises providing a visual indication within a printed copy of the word processor document or on a printer separator page that is provided when the word processor document is printed.

11. The method of claim 1, further comprising communicating each current validity status for one or more of the link representations within the word processor document to additional word processor documents containing the same link representations to the same external sources.

12. The method of claim 1, wherein the step of providing notification of the current validity status further comprises providing notification by E-mail, text message, telefacsimile or telephone.

13. The method of claim 1, wherein the step of expressing the current validity status further comprises modifying, in accordance with at least one current validity status, a graphical representation of a file name associated with the word processor document or an appearance of a file folder containing the file name of the word processor document.

14. A method for supporting links within a document containing text, the method comprising:

identifying representations embedded within a word processor document of links to sources external to the word processor document, the word processor document produced using a word processor program running on a computing system and configured to create, edit and display both text and hyperlinks within the word processor document;

appending the word processor document to include initial content representations comprising all content of each external source;

identifying a current validity status automatically for each identified link representation during creation of the word processor document, at an initial time of publication of the word processing document and at a later time after initial publication, the validity status comprising accuracy of the link representation, functionality of the link representation, accessibility of the external sources and content of the external sources; converting links having a corrupted or unavailable validity status into links having a valid status;

expressing the identified current validity status by modifying, in accordance with at least one current validity status, a graphical representation of a file name associated with the word processor document or an appearance of a file folder containing the file name of the word processor document; and providing notification to an author and readers of the word processor document of the current validity status.

15. The method of claim 14, wherein the step of modifying the appearance of the file name or the file folder further comprises changing an icon or text representing the file name or the file folder.

16. A method for supporting links within a document containing text, the method comprising:

identifying representations embedded within a word processor document of links to sources external to the word processor document;

appending the word processor document to include initial content representations comprising all content of each external source;

implementing a hash code algorithm as part of a word processing program used to create the word processor document;

using the initial content representation as input into the hash code algorithm to generate an initial content hash code;

obtaining a present content representation of each external source;

using the present content representation as input into the hash code algorithm to generate a present content hash code;

comparing the present content hash code to the initial content hash code to identify any inconsistencies between the two representations; and using the inconsistencies to identify a current validity status for each identified link representation.

17. A non-transitory computer-readable medium containing a computer-readable code that when read by a computer causes the computer to perform a method for supporting links within a document containing text, the method comprising: identifying representations embedded within a word processor document of links to sources external to the word processor document, the word processor document produced using a word processor program running on a computing system and configured to create, edit and display both text and hyperlinks within the word processor document;

appending the word processor document to include initial content representations comprising all content of each external source;

identifying a current validity status automatically for each identified link representation during creation of the word processor document, at an initial time of publication of the word processing document and at a later time after initial publication, the validity status comprising accuracy of the link representation, functionality of the link representation, accessibility of the external sources and content of the external sources;

expressing the identified current validity status of one or more of the identified link representations using aspects of the document other than the identified link representations; and providing notification to an author and readers of the word processor document of the current validity status.

18. The non-transitory computer-readable medium of claim 17, wherein the method further comprises:

obtaining a present content representation of each external source;

comparing the current content representations to the initial content representations; and identifying any inconsistencies between the two representations.

19. The non-transitory computer-readable medium of claim 17, wherein the step of expressing the current validity status further comprises modifying, in accordance with at least one current validity status, a graphical representation of a file name associated with the word processor document or an appearance of a file folder containing the file name of the word processor document.

* * * * *